United States Patent
Renner

(10) Patent No.: US 8,464,526 B2
(45) Date of Patent: Jun. 18, 2013

(54) HYDRAULIC PUMP CONTROL SYSTEM

(75) Inventor: Ross Renner, Black Creek, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1169 days.

(21) Appl. No.: 12/367,400

(22) Filed: Feb. 6, 2009

(65) Prior Publication Data
US 2010/0199655 A1   Aug. 12, 2010

(51) Int. Cl.
   *F16D 31/02*   (2006.01)
(52) U.S. Cl.
   USPC .............................................. 60/431; 60/449
(58) Field of Classification Search
   USPC ............................ 60/431, 433, 435, 436, 449
   See application file for complete search history.

(56) References Cited

U.S. PATENT DOCUMENTS

| 8,261,717 | B2 * | 9/2012 | Peotter et al. ................. 123/350 |
| 2008/0122195 | A1 | 5/2008 | Beeson et al. | |
| 2008/0264919 | A1 | 10/2008 | Helf et al. | |
| 2008/0264920 | A1 | 10/2008 | Leisner et al. | |
| 2008/0264921 | A1 | 10/2008 | Kropp et al. | |
| 2008/0264922 | A1 | 10/2008 | Fosbinder | |

OTHER PUBLICATIONS

U.S. Appl. No. 12/040,328, filed Feb. 29, 2008 by Beeson.
U.S. Appl. No. 12/358,119, filed Jan. 22, 2009 by Peters.
U.S. Appl. No. 12/358,147, filed Jan. 22, 2009 by Peters.
U.S. Appl. No. 12/361,394, filed Jan. 28, 2009 by Peotter.

* cited by examiner

*Primary Examiner* — Michael Leslie
(74) *Attorney, Agent, or Firm* — Fletcher Yoder P.C.

(57) ABSTRACT

A hydraulic load ramping system, in certain aspects, may utilize load sensing feedback from an engine, thereby reducing the possibility of overloading the engine as well as smoothing the transition between hydraulic load levels. In particular, by ramping between hydraulic load levels, unwanted movement of hydraulically-driven equipment may be minimized. In addition, by efficiently monitoring the load sensing feedback and ramping between hydraulic load levels, the hydraulic output may be maximized.

20 Claims, 6 Drawing Sheets

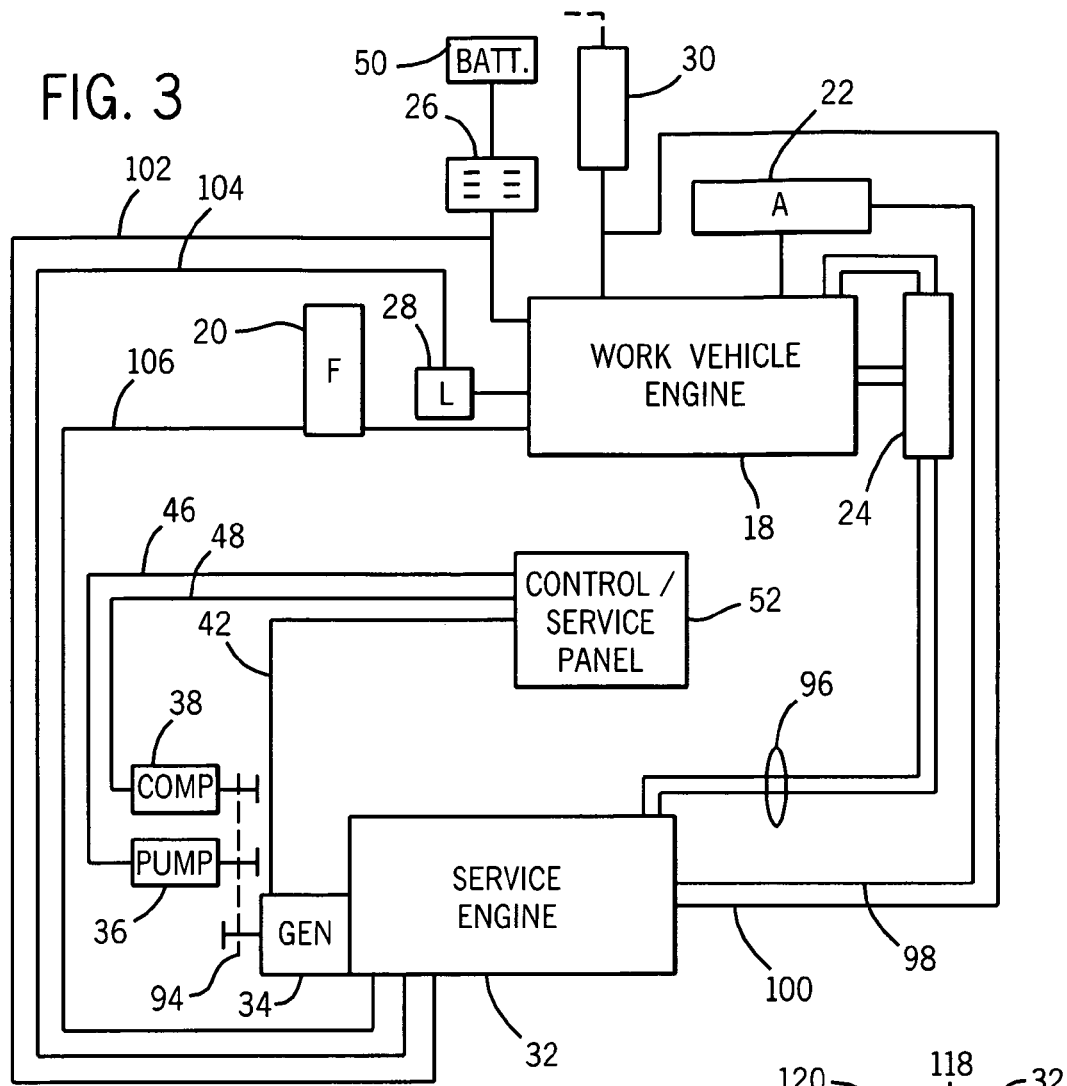
FIG. 3
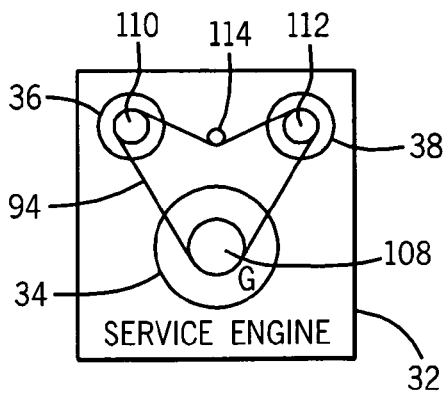
FIG. 4A
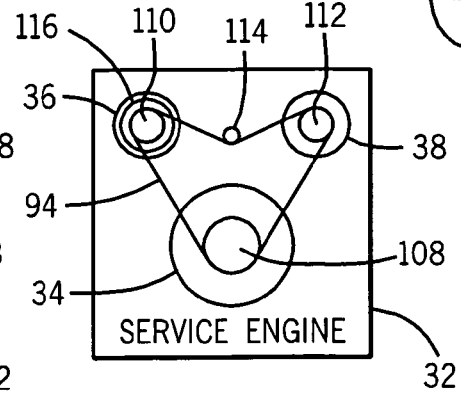
FIG. 4B
FIG. 4C

US 8,464,526 B2

HYDRAULIC PUMP CONTROL SYSTEM

BACKGROUND

The invention relates generally to a system for controlling the output of a hydraulic pump. More specifically, the invention relates to the ramping up or down of the output of a hydraulic pump of a service pack in response to load feedback of an prime mover (e.g., engine) of the service pack.

The prime mover of the service pack generally drives various loads, such as an air compressor, an electrical generator, and the hydraulic pump. These various loads can potentially overload the prime mover, reduce fuel efficiency, increase pollutant emissions, and so forth. In general, hydraulic loads may be of lower priority than pneumatic or electrical loads. Therefore, as additional loads are applied to the engine, the hydraulic pump may compensate for the additional loads to reduce the possibility that the engine will become overloaded. However, sudden reduction in output from the hydraulic pump may lead to unwanted movement of hydraulically-driven components (e.g., crane) powered by the hydraulic pump.

BRIEF DESCRIPTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

A hydraulic load ramping system, in certain aspects, may utilize load sensing feedback from an engine of a service pack, thereby reducing the possibility of overloading the engine as well as smoothing the transition between hydraulic load levels. In particular, by ramping between hydraulic load levels, unwanted movement of hydraulically-driven equipment may be minimized. In addition, by efficiently monitoring the load sensing feedback and gradually ramping between hydraulic load levels, the hydraulic output from the hydraulic pump may be maximized.

DRAWINGS

These and other features, aspects, and advantages of the present invention will become better understood when the following detailed description is read with reference to the accompanying drawings in which like characters represent like parts throughout the drawings, wherein:

FIG. 3 is a diagram of an embodiment of power systems in the work vehicle of FIG. 1, illustrating support systems of the service pack highly integrated with support systems of the work vehicle engine;

FIGS. 4A-4C are diagrams of the service pack with different arrangements of an electrical generator, a hydraulic pump, and an air compressor driven by a service pack engine;

DETAILED DESCRIPTION

Figure 1:
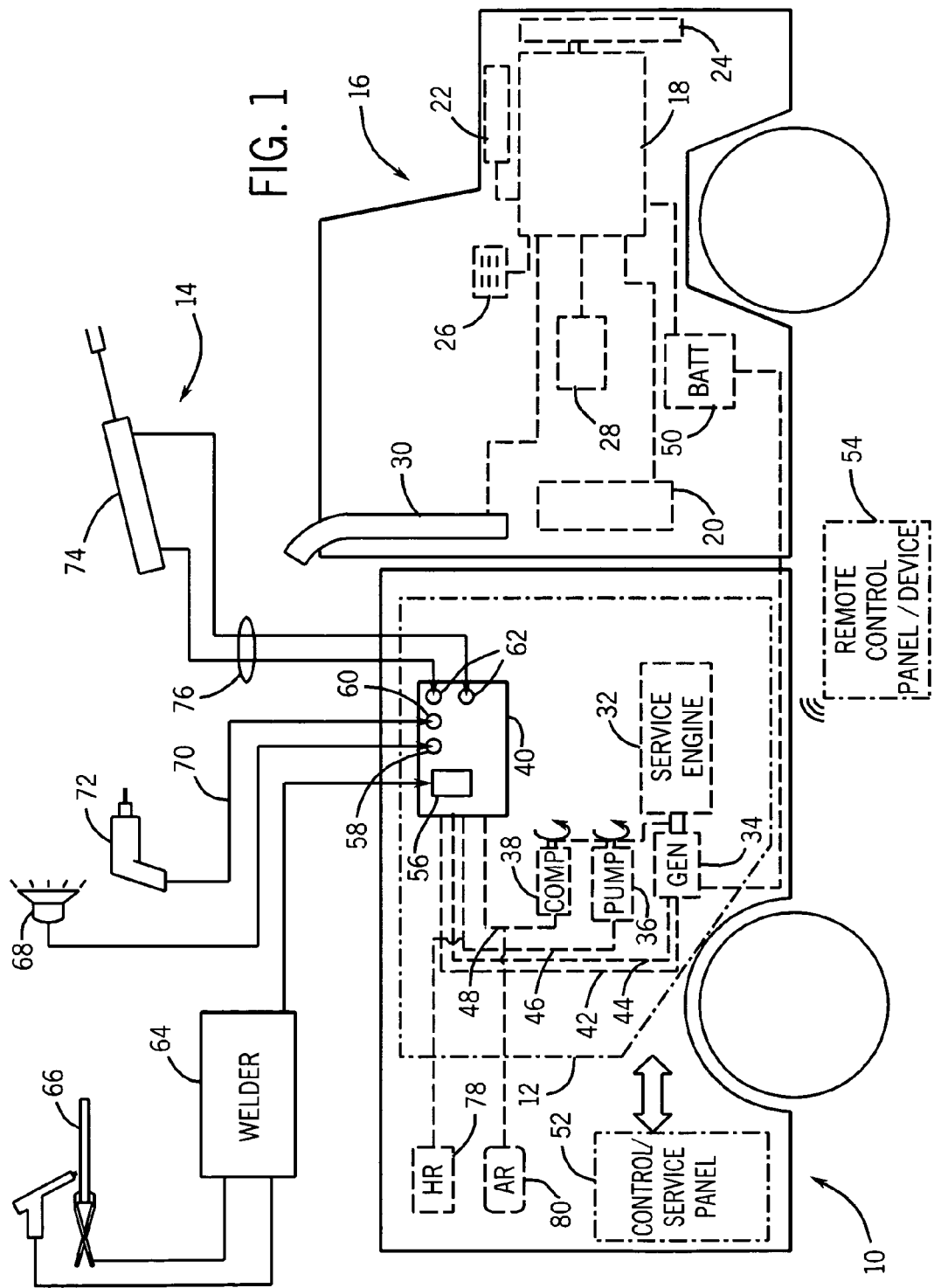
FIG. 1 is a diagram of an embodiment of a work vehicle having a service pack with a load control and ramping system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In certain embodiments, a prime mover (e.g., an engine) drives one or more loads alone or in combination with one another. The prime mover may include a spark ignition (SI) engine or a compression ignition (CI) engine. In many applications, the size of the prime mover is limited due to constraints in size, weight, cost, and so forth. Unfortunately, the prime mover can become overloaded by one or more loads during operation. For example, the prime mover may drive an electrical generator, an air compressor, a hydraulic pump, and so forth. Thus, the electrical loads may include various electrical tools, lights, a welding torch, a cutting torch, and the like. The pneumatic loads may include an air tool, a pneumatic spray gun, and the like. Furthermore, the hydraulic loads may include a hydraulic lift, a hydraulic crane, a hydraulic stabilizer, a hydraulic tool, and the like. Each of these loads has certain demands, which can overload the prime mover either alone or in certain combinations with one another.

Since the hydraulic loads may generally have lower priority than the pneumatic or electrical loads, one possible solution for reducing the possibility of overloading the prime mover may be to decrease the output of the hydraulic pump when loads are applied to the prime mover and then increase the output of the hydraulic pump when loads are subsequently removed. As discussed below, embodiments of the present technique provide a unique solution for ramping the output of the hydraulic pump up or down in response to load sensing feedback of the prime mover. Thus, the disclosed embodiments relate or deal with any application where a prime mover or power source is limited in power, such as CI or SI engine, and the load or combination of loads have the potential to overload the prime mover.

In certain embodiments, the disclosed hydraulic load ramping techniques may be used with various service packs to prevent an overload condition of a diesel engine power source that is directly coupled to multiple loads, specifically an air compressor, hydraulic pump, and electrical generators, where the individual and/or combination of these loads have the potential to overload the diesel engine power source. For example, the disclosed embodiments may be used in combination with any and all of the embodiments set forth in U.S. application Ser. No. 11/742,399, filed on Apr. 30, 2007, and entitled "ENGINE-DRIVEN AIR COMPRESSOR/GENERATOR LOAD PRIORITY CONTROL SYSTEM AND METHOD," which is hereby incorporated by reference in its entirety. By further example, the disclosed embodiments may be used in combination with any and all of the embodiments set forth in U.S. application Ser. No. 11/943,564, filed on Nov. 20, 2007, and entitled "AUXILIARY SERVICE PACK FOR A WORK VEHICLE," which is hereby incorporated by reference in its entirety.

As discussed below, the present embodiments utilize load sensing feedback from the prime mover (e.g., engine) to control the operation of a hydraulic pump. More specifically, the output of the hydraulic pump may be gradually ramped up or down based on the load sensing feedback. By gradually ramping the output of the hydraulic pump up or down, the possibility of the prime mover becoming overloaded or underutilized may be minimized. In addition, by gradually ramping the output of the hydraulic pump up or down, unwanted movement of the hydraulically-driven system may be minimized.

FIG. 1 illustrates a work vehicle 10 in accordance with the present invention. The work vehicle 10 is illustrated as a work truck, although any suitable configuration for the work vehicle 10 may be utilized. In the illustrated embodiment, the work vehicle 10 includes a service pack 12 for supplying electrical power, compressed air, and hydraulic power to a range of applications, designated generally by reference numeral 14. The work vehicle 10 has a main vehicle power plant 16 based around a work vehicle engine 18. Although the invention is not limited to any particular configuration or equipment, work vehicle engines of this type will typically be diesel engines, although gasoline engines may be used in some vehicles.

The vehicle power plant 16 may include a number of conventional support systems. For example, the work vehicle engine 18 may consume fuel from a fuel reservoir 20, typically one or more liquid fuel tanks. An air intake or air cleaning system 22 may supply air to the work vehicle engine 18, which may, in certain applications, be turbo-charged or super-charged. A cooling system 24, which may typically include a radiator, a circulation pump, a thermostat-controlled valve, and a fan, may provide for cooling the work vehicle engine 18. An electrical system 26 may include an alternator or generator, along with one or more system batteries, cabling for these systems, cable assemblies routing power to a fuse box or other distribution system, and so forth. A lube oil system 28 may typically be included for many engine types, such as for diesel engines. Such lube oil systems 28 typically draw oil from the diesel engine crankcase and circulate the oil through a filter and cooler, if present, to maintain the oil in good working condition. Finally, the power plant 16 may be served by an exhaust system 30, which may include catalytic converters, mufflers, and associated conduits.

The service pack 12 may include one or more service systems driven by a service engine 32. In a present embodiment, the service pack 12 may provide electrical power, hydraulic power, and compressed air for the various applications 14. In the diagrammatical representation of FIG. 1, for example, the service engine 32 may drive a generator 34, a hydraulic pump 36, and an air compressor 38. The service engine 32 may be of any desired type, such as a diesel engine. However, certain embodiments may use gasoline engines or other types of engines. The generator 34 may be directly driven by the service engine 32, such as by close coupling the generator 34 to the service engine 32, or may be belt-driven or chain-driven. The generator 34 may include three-phase brushless types, capable of producing power for a range of applications. However, other types of generators 34 may be employed, including single-phase generators and generators capable of producing multiple power outputs. The hydraulic pump 36 may be based on any conventional technology, such as piston pumps, gear pumps, vane pumps, and so forth and may be used with or without closed-loop control of pressure and/or flow. The air compressor 38 may also be of any suitable type, such as a rotary screw air compressor. Other suitable air compressors 38 may include reciprocating compressors, typically based upon one or more reciprocating pistons.

The systems of the service pack 12 may include appropriate conduits, wiring, tubing, and so forth for conveying the service generated by these components to an access point 40. Convenient access points 40 may be located around the periphery of the work vehicle 10. In a presently contemplated embodiment, all of the services may be routed to a common access point 40, although multiple access points 40 may certainly be utilized. The diagrammatical representation of FIG. 1 illustrates the generator 34 as being coupled to electrical cabling 42 (for AC power supply) and 44 (for 12-volt DC power supply), whereas the hydraulic pump 36 is coupled to a hydraulic circuit 46, and the air compressor 38 is coupled to an air circuit 48. The wiring and circuitry for all three systems will typically include protective circuits for the electrical power (e.g., fuses, circuit breakers, and so forth) as well as valving for the hydraulic and air service. For the supply of electrical power, certain types of power may be conditioned (e.g., smoothed, filtered, and so forth), and 12-volt power output may be provided by rectification, filtering, and regulating of the AC output. Valving for hydraulic power output may include, by way example, pressure relief valves, check valves, shut-off valves, as well as directional control valving.

In certain embodiments, the generator 34 may be coupled to the work vehicle electrical system 26, and particularly to the work vehicle battery 50. Thus, as described below, not only may the service pack 12 allow for 12-volt loads to be powered without operation of the main work vehicle engine 18, but the work vehicle battery 50 may serve as a shared battery, and may be maintained in a good state of charge by the service pack generator output.

The cabling, circuits, and conduits 42, 44, 46, and 48 may route service for all of these systems directly from connections on the service pack 12. For example, connections may be provided at or near the access point 40 of the service pack 12, such that connections can easily be made without the need to open an enclosure of the access point 40. Moreover, certain control functions may be available from a control and service panel 52. The control and service panel 52 may be located on any surface of the work vehicle 10 or at multiple locations on the work vehicle 10, and may be covered by doors or other protective structures. The control and service panel 52 need not be located at the same location, or even near the locations of the access point 40 to the electrical, hydraulic, and compressed air output points of the service pack 12. For example, the control and service panel 52 may be provided in a rear compartment covered by an access door. The control and service panel 52 may permit, for example, starting and stopping of the service engine 32 by a keyed ignition or starter button. Other controls for the service engine 32 may also be provided on the control and service panel 52. The control and service panel 52 may also provide operator interfaces for monitoring the service engine 32, such as fuel level gages, pressure gages, as well as various lights and indicators for parameters such as pressure, speed, and so forth. The control and service panel 52 may also include a stop, disconnect, or disable switch that allows the operator to prevent starting of the service engine 32, such as during transport.

As also illustrated in FIG. 1, a remote control panel or device 54 may also be provided that may communicate with the control and service panel 52 or directly with the service pack 12 wirelessly. The operator may start and stop the service pack engine 32, and control certain functions of the service pack 12 (e.g., engagement or disengagement of a clutched component, such as the hydraulic pump 36) without directly accessing either the components within the service pack 12 or the control and service panel 52.

As noted above, any desired location may be selected as a convenient access point 40 for one or more of the systems of the service pack 12. In the illustrated embodiment, for example, one or more alternating current electrical outputs, which may take the form of electrical receptacles 56 (for AC power) and 58 (for 12-volt DC power) may be provided. Similarly, one or more pneumatic connections 60, typically in the form of a quick disconnect fitting, may be provided. Similarly, hydraulic power and return connections 62 may be provided, which may also take the form of quick disconnect fittings.

In the embodiment illustrated in FIG. 1, the applications 14 may be coupled to the service pack 12 by interfacing with the outputs provided by the AC electrical receptacle 56. For example, a portable welder 64 may be coupled to the AC electrical receptacle 56, and may provide power suitable for a welding application 66. More specifically, the portable welder 64 may receive power from the electrical output of the generator 34, and may contain circuitry designed to provide for appropriate regulation of the output power provided to cables suitable for the welding application 66. The presently contemplated embodiments include welders, plasma cutters, and so forth, which may operate in accordance with any one of many conventional welding techniques, such as stick welding, tungsten inert gas (TIG) welding, metal inert gas (MIG) welding, and so forth. Although not illustrated in FIG. 1, certain of these welding techniques may call for or conveniently use wire feeders to supply a continuously fed wire electrode, as well as shielding gases and other shielding supplies. Such wire feeders may be coupled to the service pack 12 and be powered by the service pack 12.

Similarly, DC loads may be coupled to the DC receptacle 58. Such loads may include lights 68, or any other loads that would otherwise be powered by operation of the main work vehicle engine 18. The 12-volt DC output of the service pack 12 may also serve to maintain the work vehicle battery charge, and to power any ancillary loads that the operator may need during work (e.g., cab lights, hydraulic system controls, and so forth).

The pneumatic and hydraulic applications may similarly be coupled to the service pack 12 as illustrated in FIG. 1. For example, a hose 70 or other conduit may be routed from the compressed air source at the outlet 60 to a pneumatic load 72, such as an impact wrench. However, many other types of pneumatic loads 72 may be utilized. Similarly, a hydraulic load 74, such as a reciprocating hydraulic cylinder may be coupled to the hydraulic service 62 by means of appropriate hoses or conduits 76. As noted above, certain of these applications, particularly the hydraulic applications, may call for the use of additional valving. Such valving may be incorporated into the work vehicle 10 or may be provided separately either in the application itself or intermediately between the service pack 12 and the hydraulic actuators. It should also be noted that certain of the applications 14 illustrated in FIG. 1 may be incorporated into the work vehicle 10. For example, the work vehicle 10 may be designed to include a man lift, scissor lift, hydraulic tail gate, or any other driven systems which may be coupled to the service pack 12 and driven separately from the main work vehicle engine 18.

The service pack 12 may be physically positioned at any suitable location in the work vehicle 10. For example, the service engine 32 may be mounted on, beneath or beside the vehicle bed or work platform rear of the vehicle cab. In many such work vehicles 10, for example, the work vehicle chassis may provide convenient mechanical support for the service engine 32 and certain of the other components of the service pack 12. For example, steel tubing, rails, or other support structures extending between front and rear axles of the work vehicle 10 may serve as a support for the service engine 32. Depending upon the system components selected and the placement of the service pack 12, reservoirs may also be provided for storing hydraulic fluid and pressurized air, such as hydraulic reservoir 78 and air reservoir 80. However, the hydraulic reservoir 78 may be placed at various locations or even integrated into an enclosure of the service pack 12. Likewise, depending upon the air compressor 38 selected, no air reservoir 80 may be used for compressed air.

The service pack 12 may provide power for on-site applications completely separately from the work vehicle engine 18. That is, the service engine 32 may generally not be powered during transit of the work vehicle 10 from one service location to another, or from a service garage or facility to a service site. Once located at the service site, the work vehicle 10 may be parked at a convenient location, and the main work vehicle engine 18 may be shut down. The service engine 32 may then be powered to provide service from one or more of the service systems described above. In certain embodiments, clutches or other mechanical engagement devices may be provided for engagement and disengagement of one or more of the generator 34, the hydraulic pump 36, and the air compressor 38. Moreover, where stabilization of the work vehicle 10 or any of the systems is beneficial, the work vehicle 10 may include outriggers, stabilizers, and so forth, which may be deployed after parking the work vehicle 10 and prior to operation of the service pack 12.

Figure 2:
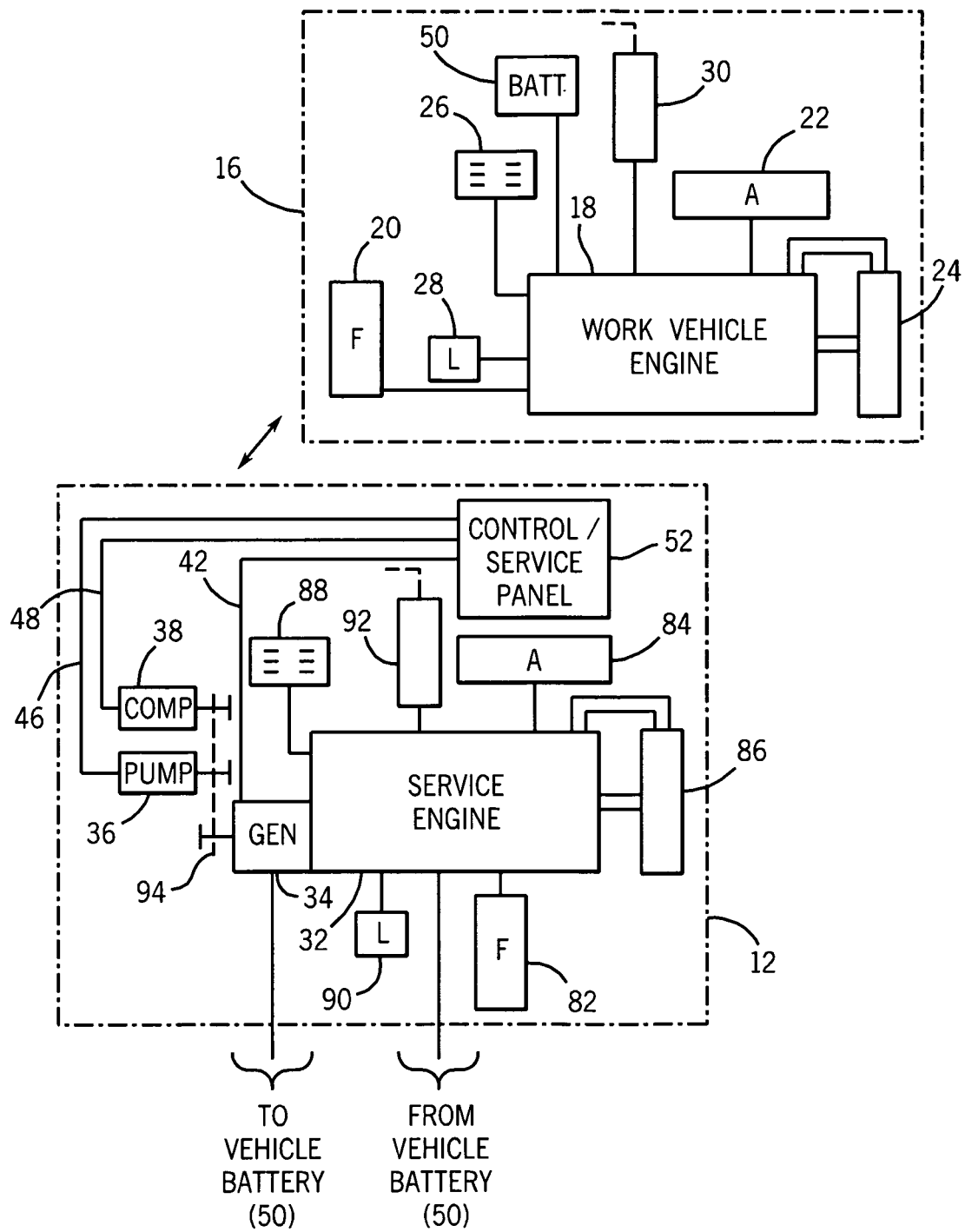
FIG. 2 is a diagram of an embodiment of power systems in the work vehicle of FIG. 1, illustrating support systems of the service pack completely separate and independent from support systems of a work vehicle engine.

Several different scenarios may be implemented for driving the components of the service pack 12, and for integrating or separating the support systems of the service pack 12 from those of the work vehicle power plant 16. One such approach is illustrated in FIG. 2, in which the service pack 12 is entirely independent and operates completely separately from the work vehicle power plant 16. In the embodiment illustrated in FIG. 2, the support systems for the work vehicle power plant 16 are coupled to the work vehicle engine 18 in the manner set forth above. In this embodiment, the service pack 12 may reproduce some or all of these support systems for operation of the service engine 32. For example, these support systems may include a separate fuel reservoir 82, a separate air intake or air cleaning system 84, a separate cooling system 86, a separate electrical protection and distribution system 88, a separate lube oil system 90, and a separate exhaust system 92.

Many or all of these support systems may be provided local to the service engine 32, in other words, at the location where the service engine 32 is supported on the work vehicle 10. On larger work vehicles 10, access to the location of the service engine 32, and the service pack 12 in general, may be facilitated by the relatively elevated clearance of the work vehicle 10 over the ground. Accordingly, components such as the fuel reservoir 82, air intake or air cleaning system 84, cooling system 86, electrical protection and distribution system 88, and so forth, may be conveniently positioned so that these components can be readily serviced. Also, the hydraulic pump 36 and air compressor 38 may be driven by a shaft extending from the generator 34, such as by one or belts or chains 94. As noted above, one or both of these components, or the generator 34 itself, may be provided with a clutch or other mechanical disconnect to allow them to idle while other systems of the service pack 12 are operative.

FIG. 3 represents an alternative configuration in which the service pack 12 support systems are highly integrated with those of the main work vehicle power plant 16. In the illustrated embodiment of FIG. 3, for example, all of the systems described above may be at least partially integrated with those of the work vehicle power plant 16. Thus, coolant lines 96 may be routed to and from the work vehicle cooling system 24 of the work vehicle 10, while an air supply conduit 98 may be routed from the air intake and cleaning system 22 of the work vehicle 10. Similarly, an exhaust conduit 100 may route exhaust from the service engine 32 to the exhaust system 30 of the work vehicle 10. The embodiment of FIG. 3 also illustrates integration of the electrical systems of the work vehicle 10 and the service pack 12, as indicated generally by electrical cabling 102, which may route electrical power to and from the distribution system 26 of the work vehicle 10. The systems may also integrate lube oil functions, such that lubricating oil may be extracted from both crank cases in common, to be cleaned and cooled, as indicated by conduit 104. Finally, a fuel conduit 106 may draw fuel from the main fuel reservoir 20 of the work vehicle 10, or from multiple reservoirs where such multiple reservoirs are present on the work vehicle 10.

In presently contemplated embodiments, integrated systems of particular interest include electrical and fuel systems. For example, while the generator 34 of the service pack 12 may provide 110-volt AC power for certain applications, its ability to provide 12-volt DC output may be particularly attractive to supplement the charge on the work vehicle battery 50, for charging other batteries, and so forth. The provision of both power types, however, makes the system even more versatile, enabling 110-volt AC loads to be powered (e.g., for tools, welders, and so forth) as well as 12-volt DC loads (e.g., external battery chargers, portable or cab-mounted heaters or air conditioners, and so forth).

Integrated solutions between those of FIG. 2 and FIG. 3 may also be utilized. For example, some of the support systems may be separated in the work vehicle 10 both for functional and mechanical reasons. Embodiments of the present invention thus contemplate various solutions between those shown in FIG. 2 and FIG. 3, as well as some degree of elimination of redundancy between these systems. For instance, at least some of the support systems for the main work vehicle engine 18 may be used to support the service pack 12. For example, at least the fuel supply and electrical systems may be at least partially integrated to reduce the redundancy of these systems. The electrical system may thus serve certain support functions when the work vehicle engine 18 is turned off, removing dependency from the electrical system, or charging the vehicle battery 50. Similarly, heating, ventilating, and air conditioning systems may be supported by the service pack engine 32, such as to provide heating of the work vehicle 10 when the main work vehicle engine 18 is turned off. Thus, more or less integration and removal of redundancy may be possible.

The foregoing service pack systems may also be integrated in any suitable manner for driving the service components, particularly the generator 34, hydraulic pump 36, and air compressor 38, and particularly for powering the on-board electrical system. FIGS. 4A-4C illustrate simplified diagrams of certain manners for driving these components from the service engine 32. In the embodiment illustrated in FIG. 4A, the generator 34 may be close-coupled to the output of the engine 32, such as directly to the engine flywheel or to a shaft extending from the engine 32. This coupling may be disposed in a support housing used to support the generator 34 on the engine block or other engine support structures. A sheave 108 may be mounted to an output shaft extending from the generator, and similar sheaves 110 and 112 may be coupled to the hydraulic pump 36 and air compressor 38. One or more belts and/or clutches may be drivingly coupled between these components, and an idler 114 may be provided for maintaining tension on the belt. Such an arrangement is shown in FIG. 4B, in which the hydraulic pump 36 is driven through a clutch 116, such as an electric clutch. Although not shown specifically, any one of the components may be similarly clutched to allow for separate control of the components. Such control may be useful for controlling the power draw on the service engine 32, particularly when no load is drawn from the particular component, and when the component is not needed for support of the main vehicle engine systems (e.g., maintaining a charge on the vehicle batteries).

These components may be supported in any suitable manner, and may typically include some sort of rotating or adjustable mount such that the components may be swung into and out of tight engagement with the belt to maintain the proper torque-carrying tension on the belt and avoid slippage. More than one belt may be provided on appropriate multi-belt sheaves, where the torque required for turning the components is greater than that available from a single belt. Other arrangements, such as chain drives, may also be used. Moreover, as described above, the generator 34 may also be belt or chain driven, or more than one component may be driven directly by the service engine 32, such as in an in-line configuration. In a further alternative arrangement, one or more of the components may be gear driven, with gearing providing any required increase or decrease in rotational speed from the output speed of the service engine 32. An exemplary arrangement of this type is shown diagrammatically in FIG. 4C. In the illustrated arrangement, a support adapter 118 mounts the generator 34 on the service engine 32, and the hydraulic pump 36 and air compressor 38 are driven by a gear reducer 120. In such arrangements, one or more clutches may still be provided upstream or downstream of the gear reducer 120 for selective control of the components.

The particular component or components that are directly and/or indirectly driven by the service engine 32 may be selected based upon the component and engine specifications. For example, it may be desirable to directly drive the hydraulic pump 36, and to drive the generator 34 via a belt or gear arrangement, permitting the service engine 32 to operate at a higher speed (e.g., 3200 RPM) while allowing a reduced speed to drive the generator 34 (e.g., 1800 RPM for near 60 Hz AC output of a 4 pole generator).

Figure 5:
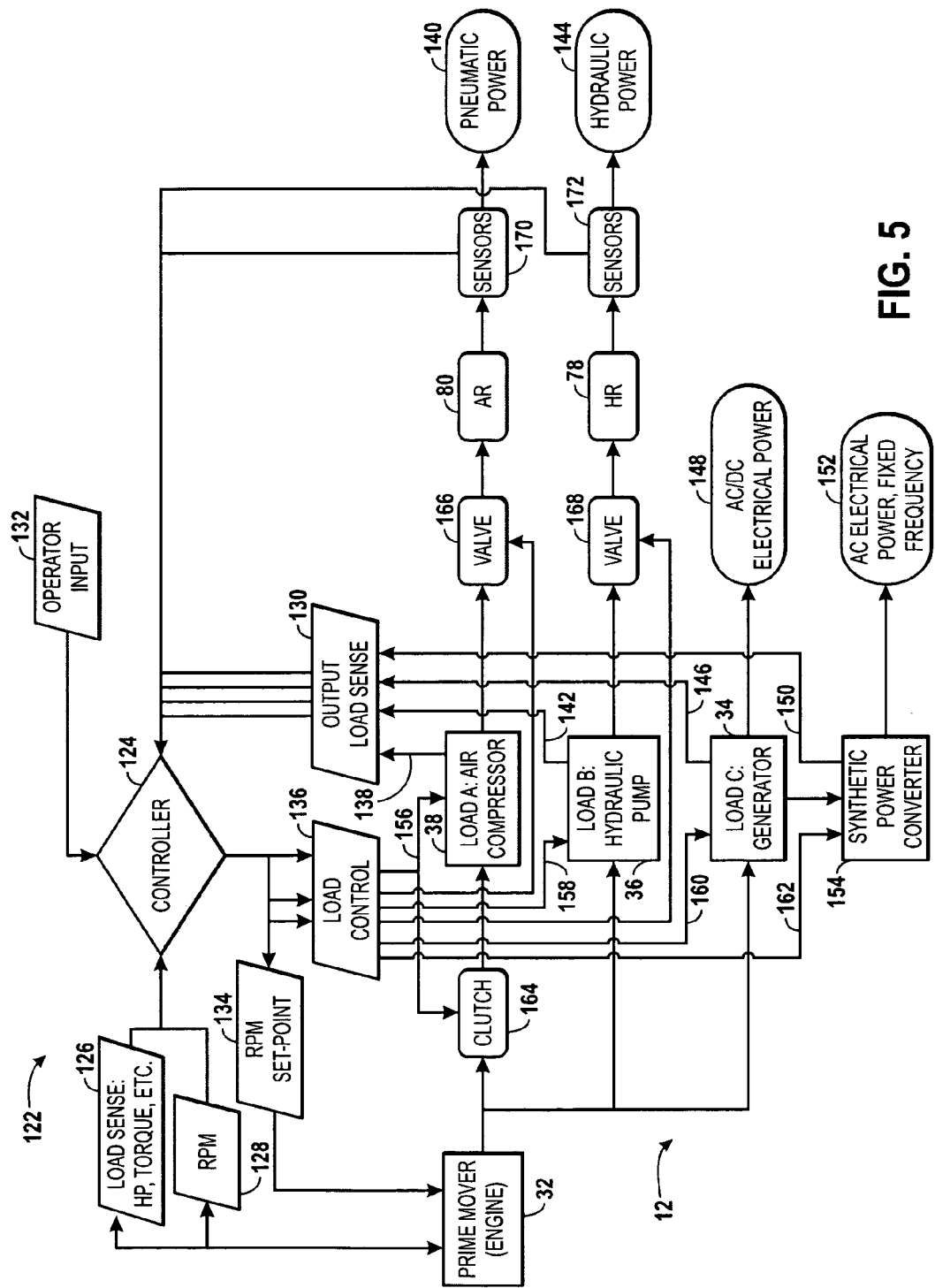
FIG. 5 is a block diagram illustrating an embodiment of the load control and ramping system for the service pack of FIGS. 1-4.

FIG. 5 is a block diagram illustrating an embodiment of a load control and ramping system 122 for the service pack 12 of FIGS. 1-4. As illustrated, the load control and ramping system 122 interfaces with the service engine 32, the air compressor 38 as Load A, the hydraulic pump 36 as Load B, and the generator 34 as Load C. The service engine 32 may be configured to selectively drive one or more of the Loads A, B, and C (e.g., compressor 38, pump 36, and generator 34) based on load sense feedback to a controller 124. In particular, the controller 124 may receive a load sense 126 and/or RPM feedback 128 from the service engine 32. The controller 124 also may receive output load sense 130 from one or more of the Loads A, B, and C (e.g., compressor 38, pump 36, and generator 34). In addition, the controller 124 may receive operator input 132 regarding desired services, priority of the Loads A, B, and C, and so forth. In response to the load sense 126, the RPM feedback 128, and/or the output load sense 130, the controller 124 may provide an RPM set-point 134 to the service engine 32 and/or load control 136 to the various Loads A, B, and C (e.g., compressor 38, pump 36, and generator 34).

In the illustrated embodiment, the controller 124 is configured to manage or control all or part of the major power or load functions of the unit. For example, the controller 124 may utilize the engine load sense 126 signal from the service engine 32 to determine how much additional load can be applied to the engine 32 without overloading the engine 32. For example, the load sense 126 may include a measurement of horsepower, speed, torque, exhaust temperature, throttle/actuator position, fuel injection quantity, or another suitable measurement directly associated with the service engine 32. By further example, the load sense 126 may use throttle/actuator position of a carburetor or fuel injection system as a measurement of fuel quantity being injected into the service engine 32, which in turn provides an indication of load on the service engine 32. Thus, an increase in fuel injection may indicate an increase in load on the service engine 32, whereas a decrease in fuel injection may indicate a decrease in load on the service engine 32. If the load sense 126 indicates or predicts an overload condition on the service engine 32, then the controller 124 can adjust or turn on/off the output to the various Loads A, B, and C (e.g., compressor 38, pump 36, and generator 34) via the load control 136, thereby reducing or preventing the possibility of overloading the service engine 32.

In certain embodiments, the controller 124 utilizes both the engine load sense 126 signal along with the engine RPM feedback 128 signal to accurately determine and manage the load on the service engine 32. The controller 124 can then determine the current load, remaining available load that can be applied to the service engine 32 for a given RPM, and any potential overload condition based on the load sense 126 signal, RPM feedback 128 signal, and RPM set-point 134.

In certain embodiments, the controller 124 may utilize the output load sense 130 signal alone or in combination with the load sense 126 signal and/or RPM feedback 128 signal to accurately determine and manage the load on the service engine 32. For example, the output load sense 130 signal may relate to a pneumatic load 138 associated with pneumatic power 140 generated by the air compressor 38. The pneumatic load 138 may relate to air pressure, air flow rate, or some other suitable load measurement. The output load sense 130 signal may also relate to a hydraulic load 142 associated with hydraulic power 144 generated by the hydraulic pump 36. The hydraulic load 142 may relate to hydraulic pressure, hydraulic flow rate, or some other suitable load measurement. The output load sense 130 signal may also relate to an electrical load 146 associated with AC/DC electrical power 148 generated by the generator 34. Likewise, the output load sense 130 signal may relate to an electrical load 150 associated with AC electrical power (fixed frequency) 152 generated by a synthetic power converter 154 coupled to the generator 34. The electrical loads 146 and 150 may relate to current, voltage, or some other suitable load measurement. Each of these load signals 138, 142, 146, and 150 of the output load sense 130 may be used alone or in combination with the engine load sense 126 and/or RPM feedback 128 to make load adjustments and/or engine adjustments to power match the service engine 32 with the various Loads A, B, and C (e.g., compressor 38, pump 36, and generator 34).

The controller 124 may be configured to generate and transmit load control signals 156, 158, 160, and 162 via the load control 136 to the compressor 38, the hydraulic pump 36, the generator 34, and the synthetic power converter 154 based on load sense 126, the RPM feedback 128, and/or the output load sense 130. For example, the controller 124 may be configured to selectively engage or disengage one or more of the loads (e.g., compressor 38, pump 36, generator 34, and converter 154), individually adjust output levels of the loads, or a combination thereof. For example, the controller 124 may provide load control 136 (via signals 156, 158, 160, and 162) that prioritizes the various loads, and then shuts off and/or reduces output of the less important loads if the service engine 32 cannot meet the demands. For example, the operator input 132 may prioritize the loads as: (1) electrical power 148, (2) pneumatic power 140, (3) electrical power 152, and (4) hydraulic power 144.

However, any other prioritization of the loads may be selected by the user or set as a default for the controller 124. If the controller 124 then receives load sense 126, RPM feedback 128, and output load sense 130 indicative of a possible overload condition on the engine 32, then the controller 124 may provide load control 136 that increases the RPM set-point 134 and/or reduces or shuts off the lowest priority load (e.g., hydraulic power 144). If this is sufficient to prevent an overload condition, then the controller 124 may not make any further changes until the controller 124 identifies another potential overload condition. If this is not sufficient to prevent the overload condition, then the controller 124 may take further measures. For example, the controller 124 may provide load control 136 that further increases the RPM set-point 134 and/or reduces or shuts off the next lowest priority load (e.g., electrical power 152). If this is sufficient to prevent an overload condition, then the controller 124 may not make any further changes until the controller 124 identifies another potential overload condition. However, again, if this is not sufficient to prevent the overload condition, then the controller 124 may take further measures continuing with the next lowest priority loads. In each step, the controller 124 may reduce output and/or disconnect devices coupled to the various loads (e.g., compressor 38, pump 36, generator 34, and converter 154).

Likewise, the controller 124 may provide load control 136 that prioritizes the various loads (e.g., compressor 38, pump 36, generator 34, and converter 154), and then turns on and/or increases power output of the loads in order of priority if the service engine 32 exceeds the demands. In other words, the controller 124 can make adjustments for both overload and under load conditions to better power match the capabilities of the service engine 32 with the loads (e.g., compressor 38, pump 36, generator 34, and converter 154). For example, in the case of an under load condition (e.g., wasted power), the controller 124 may simply reduce the RPM set-point 134 if additional output power is not needed from the compressor 38, pump 36, generator 34, or converter 154. Otherwise, if there is an under load condition and a need for additional output power, then the controller 124 may increase pneumatic power 140, hydraulic power 144, electrical power 148, and/or electrical power 152. Again, the controller 124 may increase power based on the priority of loads (e.g., compressor 38, pump 36, generator 34, and converter 154). Thus, if the highest priority is pneumatic power 140, then the controller 124 may increase pneumatic power 140 prior to increasing hydraulic power 144. However, any suitable priority of loads is within the scope of the disclosed embodiments.

In certain embodiments, the service pack 12 may include a direct coupling, belt and pulley system, gear and chain system, clutch system, or a combination thereof, between the service engine 32 and the Loads A, B, and C (e.g., compressor 38, pump 36, and generator 34). As illustrated, the service engine 32 includes a clutch 164 configured to selectively engage and disengage the air compressor 38. Likewise, a clutch may be used between the service engine 32 and the hydraulic pump 36 and/or the generator 34. The clutch 164 may be used to remove or add a load (e.g., compressor 38) to the service engine 32 based on the load control 136. In some embodiments, the system 122 may include a switch, valve, or other actuator configured to engage and disengage each load, either individually or collectively with the other loads. Thus, the controller 124 can more closely power match the service engine 32 with the various loads (e.g., compressor 38, pump 36, generator 34, and converter 154).

As illustrated, the air reservoir 80 may be associated with a valve 166 for controlling the flow of air from the air compressor 38 to the air reservoir 80. Likewise, the hydraulic reservoir 78 may similarly be associated with a valve 168 for controlling the flow of hydraulic fluid from the hydraulic pump 36 to the hydraulic reservoir 78. In particular, in certain embodiments, the flow of air into the air reservoir 80 may be controlled by selectively engaging or disengaging the clutch 164 while simultaneously disengaging or engaging the valve 166. Likewise, the flow of hydraulic fluid into the hydraulic reservoir 78 may be similarly controlled. In addition, the air reservoir 80 may be associated with sensors 170 for use in the control of the air compressor 38. Likewise, the hydraulic reservoir 78 may be similarly associated with sensors 172 for use in the control of the hydraulic pump 36. More specifically, the sensors 170, 172 may generate signals corresponding to pressure, flow rate, vibration, and so forth. These signals may be sent to the controller 124 where they may be utilized for load control 136. In particular, the controller 124 may use signals from the sensors 170, 172, as well as from other sources of the load control and ramping system 122, to detect loads on the service engine 32 and control the hydraulic pump 36 by gradually ramping its output up or down based at least in part on the detected loads.

Figure 6:
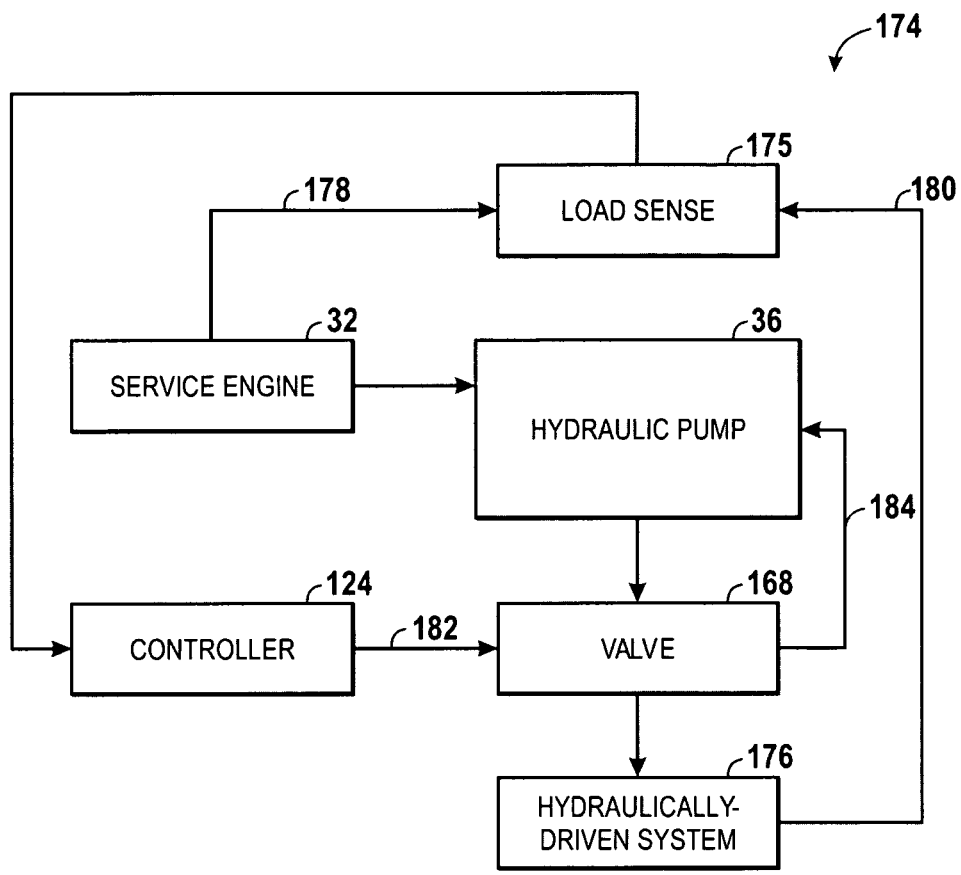
FIG. 6 is a diagram illustrating a system for controlling output of the hydraulic pump with load sensing.

FIG. 6 is a diagram illustrating a system 174 for controlling output of the hydraulic pump 36. In certain embodiments, the hydraulic pump 36 may be described as a variable displacement flow compensating piston pump. However, in other embodiments, the hydraulic pump 36 may be any suitable pump, such as a constant displacement pump. In the illustrated embodiment, the system 174 includes the service engine 32, the hydraulic pump 36, the controller 124, the valve 168, a load sense 175, and a hydraulically-driven system 176.

The controller 124 may be configured to sense (via load sense 175) various load conditions 178 on the service engine 32, e.g., throttle/actuator position, fuel injection flow, engine torque, power output, RPM, exhaust temperature, and so forth. For example, in one specific embodiment, the load sense 175 monitors the throttle or actuator position on a carburetor or fuel injection system, thereby tracking the amount of fuel injected into the service engine 32. The amount of fuel injection may be directly correlated to the engine load. For example, greater fuel injection may correlate with greater engine load, whereas lesser fuel injection may correlate with lesser engine load. The controller 124 may also be configured to sense (via load sense 175) various load conditions 180 on the hydraulically-driven system 176, e.g., hydraulic pressure, hydraulic flow rate, torque, power, and so forth. Moreover, as discussed above, the controller 124 may also be configured to sense loads on the generator 34, air compressor 38, converter 154, and so forth.

As indicated by arrow 182, the controller 124 may be configured to control the valve 168 in response to the load conditions 178 and/or 180 received from the load sense 175. If the controller 124 identifies a possible overload condition, then the controller 124 may be configured to control the valve 168 to reduce the hydraulic-based output and, thus, eliminate the possible overload condition. However, the controller 124 may also monitor under load conditions (e.g., wasted power), and reduce speed of the service pack engine 32, increase the hydraulic-based load on the system, and so forth.

The hydraulic pump 36 may be configured to respond to the hydraulic pressure in the system via an internal flow compensator. For example, the hydraulic pump 36 may receive feedback 184 relating to the pressure drop across the valve 168. Specifically, the hydraulic pump 36 may increase pump displacement in response to a low hydraulic load (e.g., a low pressure drop) in the system. Similarly, the hydraulic pump 36 may decrease pump displacement in response to a high hydraulic load (e.g., a high pressure drop) in the system. Again, the hydraulic load may correspond to a low or high pressure drop across the valve 168, which triggers the hydraulic pump 36 to adjust the displacement.

In certain embodiments, the hydraulic pump 36 may include a piston, a shaft, and a variable displacement mechanism (e.g., a swash plate) disposed between the piston and the shaft. For example, the swash plate may be described as a disk attached to the shaft, wherein the disk has an adjustable angle relative to the shaft (e.g., between 0 and 90 degrees). The swash plate may provide maximum piston displacement at an angle less than 90 degrees between the swash plate and shaft, and may provide minimum piston displacement at an angle of 90 degrees between the swash plate and shaft. Thus, in certain embodiments, the hydraulic pump 36 may adjust the angle of the swash plate and, thus the displacement of the piston, to vary the output of the hydraulic pump 36 in response to the sensed pressure drop across the valve 168. Furthermore, as discussed below, the disclosed embodiments enable control of the valve 168 in response to load conditions 178 and/or 180 from the load sense 175. As a result, the control scheme enables control of the hydraulic pump 36 such that the service pack engine 32 may not be overloaded beyond its limits.

In the illustrated embodiment, the controller 124 may control the valve 168 to induce a change in the hydraulic load (e.g., pressure drop) associated with the hydraulic pump 36. Specifically, the valve 168 may be a variable orifice valve operated by a drive, such as a solenoid. Thus, the valve 168 may provide a variable opening or path for the hydraulic fluid to pass on to the hydraulically-driven system 176. As a result, the valve 168 may increase the hydraulic pressure in the system by partially closing the valve 168, or the valve 168 may decrease the hydraulic pressure in the system by partially or fully opening the valve 168. As a result of the change in pressure drop across the valve 168, the hydraulic pump 36 may compensate flow and variable displacement mechanism (e.g., swash plate). Again, as described above, although the description of the hydraulic pump 36 with respect to FIG. 6 has focused on the use of a variable displacement pump, in other embodiments, the hydraulic pump 36 may be any suitable type of pump, such as a constant displacement pump.

In particular, in certain embodiments, the controller 124 may control operation of the hydraulic pump 36 to prevent sudden movements of a crane or other hydraulic tools that may be powered by the hydraulic pump 36 and to limit output of the hydraulic pump 36 to prevent overloading of the service engine 32. More specifically, when load changes on the service engine 32 occur, they may cause the hydraulic tools attached to the hydraulic pump 36 to have sudden movements or perform erratically. These load changes may be caused by applying or removing generator 34 or air compressor 38 loads, which are also driven by the service engine 32 and may generally be given priority over hydraulic pump 36 loads. To prevent these sudden movements, the controller 124 may monitor the loads on the service engine 32 and may minimize drastic changes to the hydraulic pump 36 output by using methods to ramp up and ramp down the output of the hydraulic pump 36. At the same time, the total load on the service engine 32 may be monitored such that the output of the hydraulically-driven system 176 may be maximized. As such, the output of the hydraulic pump 36 may remain relatively smooth and transitions may be allowed over time. By doing so, the amount of erratic movements in the cranes and other hydraulic tools may be minimized.

To better illustrate how ramping of the hydraulic pump 36 may be accomplished, a simple example will be presented. Under normal operating conditions, the service engine 32 may operate at discrete speeds (e.g., 1800 rpm, 2600 rpm, 3200 rpm, and 3600 rpm). When a hydraulic load is applied to the hydraulic pump 36, the speed of the service engine 32 may be increased to a higher discrete operating speed (e.g., 3200 rpm) and the output of the hydraulic pump 36 may be ramped up to a point where the hydraulic flow from the hydraulic pump 36 meets the requirements of the hydraulic load.

If a load is subsequently applied to the generator 34 or the air compressor 38, the hydraulic pump 36 may compensate for the additional load to reduce the possibility that the service engine 32 will become overloaded. This compensation may come in the form of reduced output from the hydraulic pump 36. To prevent unwanted movement in the crane or other hydraulic tools from this reduced output, the output of the hydraulic pump 36 may be ramped down from its previous output level, such that the transition occurs more smoothly. After this transition occurs, if the load on the generator 34 or air compressor 38 that was previously applied is removed, the hydraulic pump 36 may then return to a full output condition. This process may reduce unwanted movements in the crane or other hydraulic tools. Once all loads are removed, the service engine 32 may return to lower operating speed (e.g., 1800 rpm or 2600 rpm).

The amount of ramping used to reduce the unwanted movements in the crane or other hydraulic tools may vary by application. However, an important consideration is to remove sudden spikes when transitioning between operating modes of the hydraulic pump 36 (e.g., suddenly increasing or decreasing the output of the hydraulic pump 36). Rather, by gradually ramping the output of the hydraulic pump 36, the transitioning between operating modes of the hydraulic pump 36 may be much smoother. For instance, the rate of change of output of the hydraulic pump 36 may be limited to a certain amount over a given period of time. For example, in certain embodiments, the output of the hydraulic pump 36 may only be increased or decreased by a given percentage of output over time, such as 10% over a 10-second time period, 25% over a 20-second time period, and so forth.

In addition, the process of ramping the output of the hydraulic pump 36 up or down may include the prioritization of multiple hydraulic pump 36 loads. For instance, if multiple loads are applied to the hydraulic pump 36, the controller 124, in certain embodiments, may be configured to ramp the individual loads up or down according to a pre-determined ramping scheme by, for instance, controlling (e.g., via valving) individual connections between the hydraulic pump 36 and the multiple loads. In other words, a first hydraulic load may be given priority over a second hydraulic load driven by the hydraulic pump 36. If a new load is sensed on the service engine 32, the controller 124 may first determine which hydraulic load will be given priority according to the ramping scheme. The hydraulic load which is not given priority will be the one which will have its output ramped down by the controller 124. This type of prioritization scheme may be used for multiple hydraulic loads.

In addition, although the embodiments described herein are directed toward ramping the output of the hydraulic pump 36, the techniques described herein may also be extended to other components of the load control and ramping system 122. For instance, in certain embodiments, the output of the air compressor 38 may similarly be ramped up or down in response to sensed loads on the service engine 32. Likewise, the output of the generator 34 may also be ramped up or down as described herein. In addition, in certain embodiments, the hydraulic pump 36 may be ramped up in combination with ramping down another load (e.g., a load associated with the air compressor 38 or the generator 34), or vice versa. However, as described above, the embodiments described herein are primarily directed toward ramping the output of the hydraulic pump 36 since loads on the hydraulic pump 36 may generally be given lower priority in relation to loads on the air compressor 38 and the generator 34.

Figure 7:
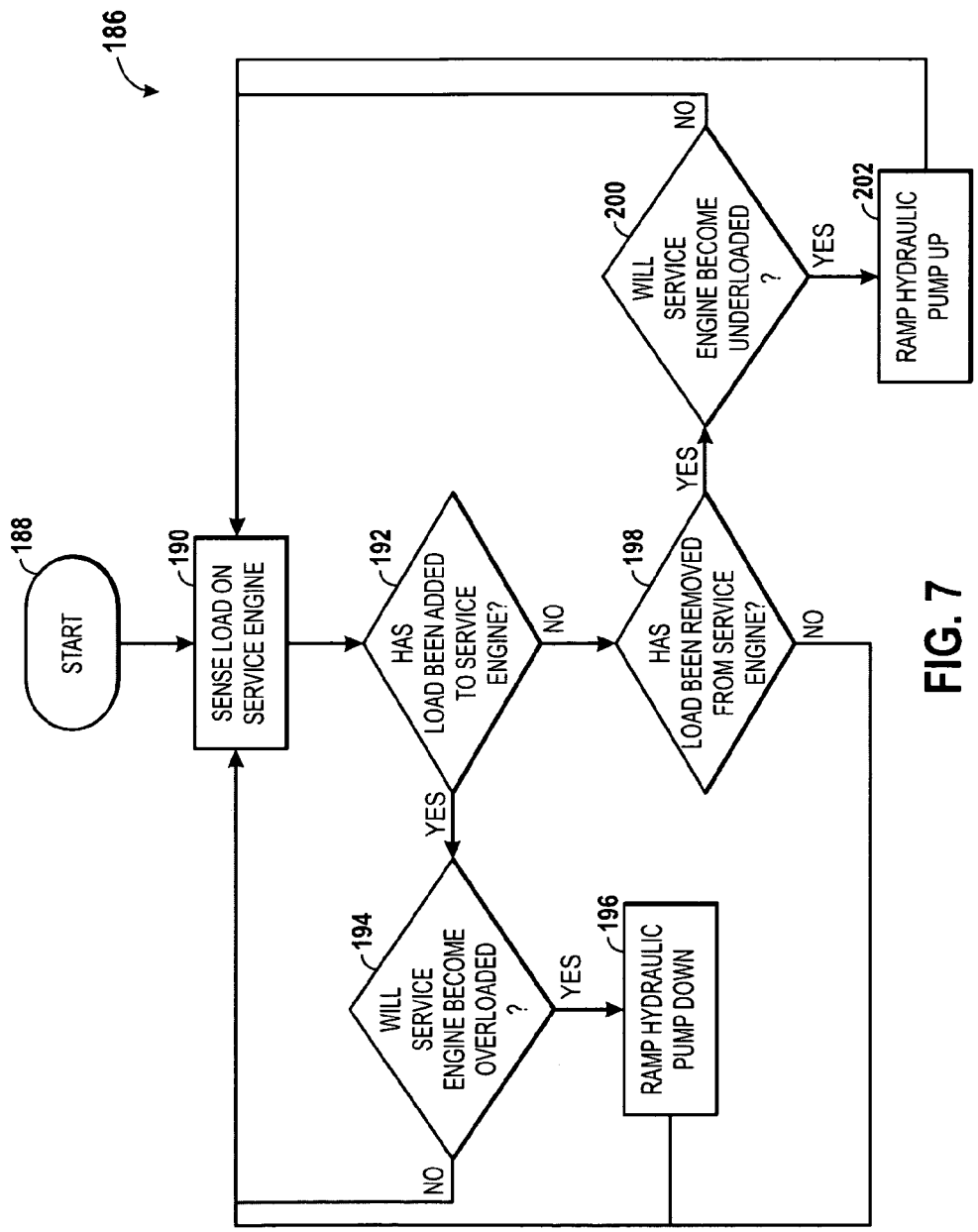
FIG. 7 is a flowchart illustrating an exemplary method for controlling and ramping the output of the hydraulic pump.

FIG. 7 is a flowchart illustrating an exemplary method 186 for controlling and ramping the output of the hydraulic pump 36. In particular, the flowchart includes a method 186 for sensing a load on the service engine 32 of the service pack 12 and ramping the output of the hydraulic pump 36 up or down in response to the sensed load. In block 188, the method 186 may start by starting the service engine 32. For example, a user may flip a switch, such as on the control and service panel 52, to start the service engine 32. In one embodiment, the clutch 164 may be disengaged at startup to ensure that the service engine 32 is started. For instance, the controller 124 may maintain the clutch 164 in a disabled state until the controller 124 determines the service pack 12 is properly configured to support a startup load. Embodiments may also include starting the service engine 32 with the clutch 164 in the same state that it was in when the service pack 12 was previously shutdown.

In block 190, the method 186 may sense a load on the service engine 32. The load sensing may include sensing loads directly from the service engine 32. In addition, the load sensing may include sensing loads from the generator 34, hydraulic pump 36, air compressor 38, converter 154, hydraulically-driven system 176, or a combination thereof. In all of these embodiments, the load on the service engine 32 may be sensed either through direct or indirect measurement. For example, the method 186 may sense a load directly from the service engine 32, a speed associated with the service engine 32, or an output load associated with the various loads (e.g., generator 34, hydraulic pump 36, air compressor 38, and converter 154).

In block 192, the method 186 may determine whether a load has been added to the service engine 32. If a load has been added to the service engine 32, the method may continue to block 194. In block 194, the method 186 may determine whether the added load would cause the service engine 32 to become overloaded. If the added load would cause the service engine 32 to be overloaded, the method may continue to block 196. In block 196, the method 186 may cause the output of the hydraulic pump 36 to gradually ramp down. By gradually ramping down the output of the hydraulic pump 36, the possibility of the service engine 32 becoming overloaded will be minimized. However, in addition, by gradually ramping down the output of the hydraulic pump 36, unwanted movement of the hydraulically-driven system 176 (e.g., crane) may be minimized. More specifically, a more gradual change in hydraulic pressure or flow rate may be achieved, thereby reducing stress in the system and enabling smoother operation of the hydraulically-driven system 176.

The output of the hydraulic pump 36 may be ramped down in a number of ways. For instance, the valve 168 associated with the hydraulic pump 36 may be gradually closed to minimize the output of the hydraulic pump 36. More specifically, in certain embodiments, the valve 168 may be a pulse width modulated (PWM) valve and may be closed from anywhere within the range of 100% fully open to 30% of the duty cycle. The position of the valve 168 may be varied continuously or stepwise between opened and closed positions in a manner that will gradually change the load and output of the hydraulic pump 36. In addition to closing the valve 168 associated with the hydraulic pump 36, the output of the hydraulic pump 36 may also be ramped down by engaging or disengaging the clutch 116 associated with the hydraulic pump 36 in tandem with controlling the closing of the valve 168.

If, in block 194, the method 186 determines that the added load would not cause the service engine 32 to be overloaded, the method 186 may continue to block 190, where the method 186 would again sense a load on the service engine 32 and start the process over again. If, in block 192, the method 186 determines that a load has not been added to the service engine 32, the method may continue to block 198.

In block 198, the method 186 may determine whether a load has been removed from the service engine 32. If a load has been removed from the service engine 32, the method 186 may continue to block 200. In block 200, the method 186 may determine whether the removed load would cause the service engine 32 to become underloaded. If the removed load would cause the service engine 32 to become underloaded, the method 186 may continue to block 202. In block 202, the method 186 may cause the output of the hydraulic pump 36 to gradually ramp up toward a power matched state between the service engine 32 and the loads. By gradually ramping up the output of the hydraulic pump 36, the possibility of the service engine 32 becoming underloaded will be minimized. However, in addition, by gradually ramping up the output of the hydraulic pump 36, unwanted sudden movement of the hydraulically-driven system 176 (e.g., crane) may be minimized.

As discussed above, the output of the hydraulic pump 36 may be ramped up in a number of ways. For instance, the valve 168 associated with the hydraulic pump 36 may be gradually opened to maximize the output of the hydraulic pump 36. More specifically, in certain embodiments, the valve 168 may be opened from anywhere within the range of 30% of the duty cycle to 100% fully open. As discussed above, the position of the valve 168 may be varied continuously or stepwise between opened and closed positions in a manner that will gradually change the load and output of the hydraulic pump 36. In addition to opening the valve 168 associated with the hydraulic pump 36, the output of the hydraulic pump 36 may also be ramped up by engaging or disengaging the clutch 116 associated with the hydraulic pump 36 in tandem with controlling the opening of the valve 168.

If, in block 200, the method determines that the removed load would not cause the service engine 32 to be underloaded, the method 186 may continue to block 190, where the method 186 would again sense a load on the service engine 32 and start the process over again. If, in block 198, the method 186 determines that a load has not been removed to the service engine 32, the method may also continue to block 190, where the method 186 would again sense a load on the service engine 32 and start the process over again.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A service pack, comprising:
   a hydraulic pump configured to drive a hydraulic system;
   an engine configured to drive the hydraulic pump; and
   a controller configured to sense an engine load and to ramp output of the hydraulic pump up or down based at least partially on the engine load.

2. The service pack of claim 1, comprising a generator and an air compressor coupled to the engine.

3. The service pack of claim 2, wherein the controller is configured to sense the engine load from the hydraulic system, the hydraulic pump, the generator, the air compressor, or a combination thereof.

4. The service pack of claim 1, wherein the controller is configured to sense the engine load directly from the engine.

5. The service pack of claim 4, wherein the engine load comprises engine power, engine torque, engine RPM, engine fuel injection quantity, engine exhaust temperature, engine throttle position, or a combination thereof.

6. The service pack of claim 1, comprising a valve in fluidic communication with the hydraulic pump, wherein the controller is configured to control the valve to ramp output of the hydraulic pump up or down.

7. The service pack of claim 6, wherein the hydraulic pump comprises a clutch, and wherein the controller is configured to control the clutch and the valve in tandem to ramp output of the hydraulic pump up or down.

8. A system, comprising:
   a load ramping controller configured to sense engine load associated with an engine based on load sense feedback, wherein the load sense feedback comprises an engine load measured directly from the engine, a hydraulic load associated with a hydraulic pump coupled to the engine, a pneumatic load associated with a compressor coupled to the engine, an electrical load associated with a generator coupled to the engine, or a combination thereof;
   wherein the load ramping controller is configured to ramp output of the hydraulic pump up or down in response to the load sense feedback and a ramping control scheme.

9. The system of claim 8, wherein the ramping control scheme comprises an order of priority of a plurality of hydraulic loads on the engine.

10. The system of claim 9, wherein at least one of the hydraulic loads comprise a hydraulically-driven crane.

11. The system of claim 8, wherein the load sense feedback comprises engine power, engine torque, engine RPM, engine fuel injection quantity, engine exhaust temperature, engine throttle position, or a combination thereof.

12. The system of claim 8, wherein the load sense feedback comprises the engine load measured directly from the engine, the hydraulic load, the pneumatic load, and the electrical load.

13. The system of claim 8, comprising a valve in fluidic communication with the hydraulic pump, wherein the load ramping controller is configured to control the valve to ramp output of the hydraulic pump up or down.

14. The system of claim 13, wherein the hydraulic pump comprises a clutch, and wherein the load ramping controller is configured to control the clutch and the valve in tandem to ramp output of the hydraulic pump up or down.

15. The system of claim 8, comprising the engine, the hydraulic pump, the compressor, and the generator all disposed in a service pack.

16. A method of managing output of a hydraulic pump, comprising:
   obtaining load feedback associated with an engine and/or a load driven by the engine, wherein the load comprises a hydraulic pump, a compressor, a generator, or a combination thereof and
   ramping the power output of the hydraulic pump in response to the load feedback.

17. The method of claim 16, comprising measuring the engine power, engine torque, engine RPM, engine fuel injection quantity, engine exhaust temperature, engine throttle position, or a combination thereof, directly from the engine.

18. The method of claim 16, comprising measuring the load from the hydraulic pump, the compressor, the generator, or a combination thereof.

19. The method of claim 16, wherein ramping the power output of the hydraulic pump comprises controlling a valve in fluidic communication with the hydraulic pump.

20. The method of claim 19, wherein ramping the power output of the hydraulic pump comprises controlling a clutch associated with the hydraulic pump.

* * * * *